July 14, 1936.  R. B. EDMONDSON  2,047,676

FISHHOOK

Filed Feb. 5, 1935

Inventor:
Robert B. Edmondson
by: 
Attorney.

Patented July 14, 1936

2,047,676

UNITED STATES PATENT OFFICE 2,047,676

FISHHOOK

Robert B. Edmondson, Riverside, Calif.

Application February 5, 1935, Serial No. 5,041

3 Claims. (Cl. 43—40)

The primary object of this invention is to provide an improved fishhook which is applicable to live or artificial bait such for example as a minnow or small fish so as to provide a sure catch. More particularly this improvement is designed for use with a lead hook in such manner as to keep the bait in natural position and so that the fish will attempt to swallow the bait tail first and be securely caught. Among further objects, one is to provide means for securing the hook to the tail portion of the bait in such manner that it will not become detached.

Figure 1:
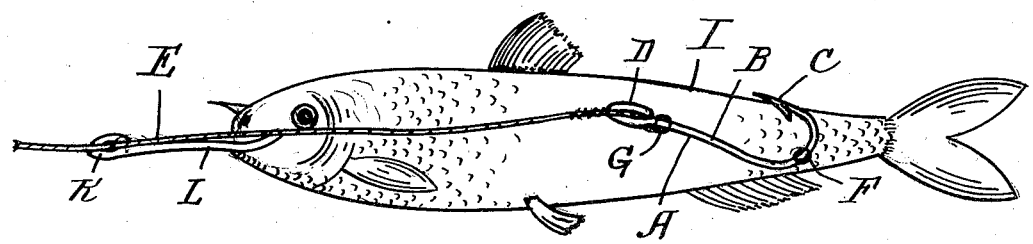
Figure 2:
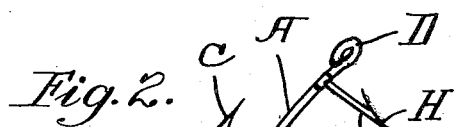
Figure 3:
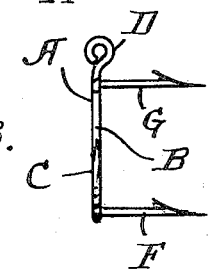

In the accompanying drawing forming part of this specification, Figure 1 is a side elevation of a fish bait showing my improved fishhook applied thereto as when in use; Fig. 2 is a perspective view of my improved fishhook, and Fig. 3 is an elevation view of my improved fishhook.

In the following description, I have described my invention applied to bait composed of a minnow or small fish but it will be understood that it can be used with any other bait desired. My invention includes as part of its combination, a fishhook A having a shank B, shaped at one end into an upwardly directed reversely curved sharpened barbed point C and provided with an eye D at its opposite end to which the fish line E is attached. From the side of said shank B at, near or intermediate its ends are as many short laterally extending substantially straight bait engaging shafts F and G as desired. Each of these shafts extends at substantially right angle to the plane of said hook and to the axis of said shank and is adapted to hold the shank firmly with the hook in a plane substantially parallel with the vertical plane of the bait. By using short straight shafts the hook can more easily be attached to and held firmly on the bait. The outer end of each of these shafts has a barbed point H which prevents the bait from being easily lost. In use shafts F and G are thrust through or into the side of the tail end of the fish bait such as I while the point of the hook points forwardly along the fish line E. In this condition the fishhook is fastened closely to one side of the bait where it is held securely by the supporting barbed shafts with its pointed end extending upwardly and directed forwardly in effectively obscure position to make a sure catch. To the forwardly extending fish line E is attached through the eye K in adjusted position the ordinary head fishhook L which is adapted to be fastened to the head portion of the bait.

In this manner the fish bait is kept facing forwardly along the fish line and when a fish bites the tail end of the bait its jaws are impinged upon the fishhook A and its shafts F and G and the fish is prevented from being detached by the barbed points both upon the shafts and hook. Should the fish swallow the bait completely it will be additionally caught by the head hook L.

My improvement is adapted for use in connection with live or dead fish bait such as minnows or small fish or with artificial or other bait of any kind desired. In practice my invention has proven itself to be effective and to produce a sure catch. It also serves to efficiently hold the bait so that it cannot easily be detached and lost without making a catch. Other means can be provided, within the spirit of my invention, in place of the eyes D and K for securing the fish line to the hooks, such for example as is in common practice for such purpose.

In accordance with the patent statutes, I have described the principles of operation of my invention together with the construction thereof which I now consider to represent the best embodiment thereof, but I desire to have it understood that the structure shown is only illustrative and that the invention can be carried out by other means and applied to uses other than those above set forth within the scope of the following claims.

Having described my invention, what I claim as new and desire to secure by Letters Patent is:

1. A fishhook for holding a fish bait having a shank to which a fish line is adapted to be secured and formed with a reverse pointed barbed end and a short substantially straight shaft integral with and extending from said shank at substantially right angles to the plane of said hook for supporting the hook in a plane substantially vertical and parallel with the vertical plane of the bait and with its pointed end directed forwardly, said shaft being pointed and barbed on its outer end.

2. A fishhook for holding a fish bait having a shank to which a fish line is adapted to be attached and formed with a reverse pointed barbed end and a plurality of short substantially straight shafts integral with and extending from said shank at substantially right angles to the plane of said hook, said shafts being spaced apart to form a support substantially vertical and parallel with the vertical plane of the bait and with the pointed end of said hook directed forwardly, said shafts being pointed and barbed on their outer ends.

3. In combination with a fish line, a fishhook secured to said line and adapted to engage and hold the head portion of a fish bait with the point of the hook directed forwardly, and a second fishhook having a shank also attached to said line back of the first hook and having a shank formed with a reverse pointed barbed end and a short substantially straight shaft integral with and extending from said shank at substantially right angles to the plane of said second hook for supporting the second hook in a plane substantially vertical and parallel with the vertical plane of the bait and with the pointed end of the second hook directed forwardly, said shaft being pointed and barbed on its outer end.

ROBERT B. EDMONDSON.